United States Patent
Kugel et al.

(10) Patent No.: US 12,247,145 B2
(45) Date of Patent: Mar. 11, 2025

(54) ADJUSTABLE HYBRID PSA/STRUCTURAL ADHESIVE BONDS BY PATTERNED SURFACE-INITIATED CURE

(71) Applicant: 3M INNOVATIVE PROPERTIES COMPANY, St. Paul, MN (US)

(72) Inventors: Alexander J. Kugel, Woodbury, MN (US); Matthew T. Holbrook, Little Canada, MN (US); Nicholas W. Lang, Minnetonka, MN (US); Dean A. Miner, Prescott, WI (US); Scott M. Spear, St. Paul, MN (US); Kristen L. Bellmer, Cottage Grove, MN (US); Benjamin J. Bending, St. Paul, MN (US); Vincent Jusuf, Minneapolis, MN (US); Daniel M. Peppin, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 70 days.

(21) Appl. No.: 17/802,826

(22) PCT Filed: Mar. 4, 2021

(86) PCT No.: PCT/IB2021/051832
§ 371 (c)(1),
(2) Date: Aug. 26, 2022

(87) PCT Pub. No.: WO2021/176400
PCT Pub. Date: Sep. 10, 2021

(65) Prior Publication Data
US 2023/0407136 A1    Dec. 21, 2023

Related U.S. Application Data

(60) Provisional application No. 62/986,250, filed on Mar. 6, 2020.

(51) Int. Cl.
*B32B 3/10*        (2006.01)
*C09J 5/02*        (2006.01)
(Continued)

(52) U.S. Cl.
CPC . *C09J 5/02* (2013.01); *C09J 5/06* (2013.01); *C09J 7/10* (2018.01); *C09J 7/35* (2018.01);
(Continued)

(58) Field of Classification Search
None
See application file for complete search history.

(56) References Cited

U.S. PATENT DOCUMENTS 3,625,875 A   12/1971  Frauenglass et al.
3,639,500 A    2/1972  Muny et al.
(Continued)

FOREIGN PATENT DOCUMENTS

CA    1301616 C     5/1992
CN    104497892     4/2015
(Continued)

OTHER PUBLICATIONS

International Search Report for PCT Application No. PCT/IB2021/051832, mailed on May 17, 2021, 4 pages.

*Primary Examiner* — Christopher M Polley
(74) *Attorney, Agent, or Firm* — Kathleen B. Gross

(57) ABSTRACT

Articles comprising, in order: a first adherend, a first primer layer, an adhesive layer, and a second adherend are provided, where the adhesive layer comprises pressure sensitive adhesive domains and structural adhesive domains. Typically, the first primer layer covers first portions of the first adherend adjacent to structural adhesive domains and does not cover second portions of the first adherend adjacent to pressure sensitive adhesive domains. Methods of making such articles are provided, which comprise applying a cure-
(Continued)

initiating primer to first portions of the first adherend to form a first primer layer while leaving second portions of the first adherend bare of the first primer layer, and thereafter applying a curable adhesive film over the first primer layer, such that portions of the curable adhesive film are cured to form structural adhesive domains and other portions remain uncured pressure sensitive adhesive domains.

18 Claims, 3 Drawing Sheets

(51) Int. Cl.
  *C09J 5/06* (2006.01)
  *C09J 7/10* (2018.01)
  *C09J 7/35* (2018.01)
  *C09J 7/38* (2018.01)
(52) U.S. Cl.
  CPC ......... *C09J 7/385* (2018.01); *C09J 2301/302* (2020.08); *C09J 2301/304* (2020.08); *C09J 2301/414* (2020.08); *C09J 2433/00* (2013.01)

(56) References Cited

U.S. PATENT DOCUMENTS

| | | | |
|---|---|---|---|
| 3,994,764 | A | 11/1976 | Wolinski |
| 3,996,308 | A | 12/1976 | Douek et al. |
| 4,074,004 | A | 2/1978 | Bateson |
| 4,170,612 | A | 10/1979 | Pastor et al. |
| 4,316,000 | A | 2/1982 | Boeder |
| 4,373,077 | A | 2/1983 | Boeder |
| 4,452,955 | A | 6/1984 | Boeder |
| 4,472,231 | A | 9/1984 | Jenkins |
| 4,569,976 | A | 2/1986 | Zimmerman et al. |
| 4,945,006 | A | 7/1990 | Muggee et al. |
| 4,946,529 | A | 8/1990 | Huddleston |
| 5,003,016 | A | 3/1991 | Boeder |
| 5,106,808 | A | 4/1992 | Boeder |
| 5,466,325 | A | 11/1995 | Mizuno et al. |
| 5,959,011 | A | 9/1999 | Mizuno et al. |
| 6,242,504 | B1 | 6/2001 | Meyer-Roscher et al. |
| 6,565,969 | B1 | 5/2003 | Lamon et al. |
| 6,734,249 | B1 | 5/2004 | Bulluck et al. |
| 8,962,751 | B2 | 2/2015 | Inoue et al. |
| 9,102,774 | B2 | 8/2015 | Clapper et al. |
| 9,265,156 | B2 | 2/2016 | Shimura et al. |
| 9,296,188 | B1 | 3/2016 | Cray et al. |
| 11,370,940 | B2 | 6/2022 | Townsend |
| 2004/0228998 | A1 | 11/2004 | Haas |
| 2005/0214497 | A1 | 9/2005 | Bilodeau |
| 2005/0230960 | A1 | 10/2005 | Bilodeau et al. |
| 2008/0196822 | A1 | 8/2008 | Satoh |
| 2008/0242764 | A1 | 10/2008 | Wallace et al. |
| 2010/0061823 | A1 | 3/2010 | Attarwala et al. |
| 2010/0255239 | A1 | 10/2010 | Hammond et al. |
| 2011/0151195 | A1 | 6/2011 | Mitsukura et al. |
| 2012/0270962 | A1* | 10/2012 | Hecht ............... A61K 6/30 526/204 |
| 2013/0012614 | A1* | 1/2013 | Abuelyaman ........ C08F 20/12 526/261 |
| 2013/0052460 | A1 | 2/2013 | Iseki et al. |
| 2013/0184394 | A1 | 7/2013 | Satrijo et al. |
| 2014/0138013 | A1 | 5/2014 | Attarwala |
| 2015/0165670 | A1 | 6/2015 | Hebert et al. |
| 2015/0284601 | A1* | 10/2015 | Yurt ............... C09J 133/08 252/183.11 |
| 2016/0108287 | A1 | 4/2016 | Schümann |
| 2016/0108292 | A1 | 4/2016 | Yamakami |
| 2016/0289513 | A1 | 10/2016 | Behling et al. |
| 2017/0066947 | A1 | 3/2017 | Dietze |
| 2017/0246660 | A1 | 8/2017 | Thompson |
| 2018/0215955 | A1 | 8/2018 | Claret |
| 2018/0237585 | A1 | 8/2018 | Liu |
| 2018/0311113 | A1* | 11/2018 | Moser ............... A61K 6/20 |
| 2018/0311114 | A1* | 11/2018 | Moser ............... A61K 6/30 |
| 2018/0312613 | A1 | 11/2018 | Townsend |
| 2020/0062998 | A1 | 2/2020 | Schümann |
| 2020/0362204 | A1 | 11/2020 | Ranade |
| 2021/0102095 | A1 | 4/2021 | Ranade et al. |
| 2021/0102097 | A1 | 4/2021 | Ranade et al. |
| 2022/0281159 | A1 | 9/2022 | Kugel et al. |

FOREIGN PATENT DOCUMENTS

| | | | |
|---|---|---|---|
| DE | 10259457 B4 | 1/2010 | |
| DE | 102015009764 | 2/2017 | |
| EP | 0232936 A2 | 8/1987 | |
| EP | 0140006 B2 | 7/1995 | |
| EP | 0889105 A2 | 1/1999 | |
| EP | 2014734 A1 | 1/2009 | |
| EP | 1800865 B2 | 2/2013 | |
| GB | 1448257 A | 9/1976 | |
| GB | 2121811 | 1/1984 | |
| GB | 2121811 A * | 1/1984 | ............... C09J 4/00 |
| GB | 2448257 | 10/2008 | |
| JP | 58171462 | 10/1983 | |
| JP | 6026079 A | 2/1985 | |
| JP | 05320284 | 12/1993 | |
| JP | H07133467 | 5/1995 | |
| JP | 09111193 A | 4/1997 | |
| JP | 11065112 A | 3/1999 | |
| JP | 4711783 B2 | 6/2011 | |
| WO | WO 2012-043664 | 4/2012 | |
| WO | 2014078115 A1 | 5/2014 | |
| WO | 2015100194 A1 | 7/2015 | |
| WO | WO 2017-052680 | 3/2017 | |
| WO | WO-2017095704 A1 * | 6/2017 | ........... A61K 6/0023 |
| WO | 2019157262 A1 | 8/2019 | |
| WO | 2019157264 A1 | 8/2019 | |
| WO | 2019157265 A1 | 8/2019 | |
| WO | 2019164678 A1 | 8/2019 | |

* cited by examiner

ADJUSTABLE HYBRID PSA/STRUCTURAL ADHESIVE BONDS BY PATTERNED SURFACE-INITIATED CURE

CROSS REFERENCE TO RELATED APPLICATIONS

This application is a national stage filing under 35 U.S.C. 371 of PCT/IB2021/051832, filed Mar. 4, 2021, which claims the benefit of U.S. application Ser. No. 62/986,250, filed Mar. 6, 2020, the disclosure of which is incorporated by reference in its entirety herein.

FIELD OF THE DISCLOSURE

This disclosure relates to bonding of adherends with adhesive layers that possess both pressure sensitive adhesive domains and structural adhesive domains and methods of making such bonds using patterned application of cure-initiating primers.

BACKGROUND OF THE DISCLOSURE

Applicants have previously investigated cure of adhesive films to form structural adhesive bonds, as disclosed in these references: WO 2019/157262 "Film-Initiated Cure of Structural Adhesive Film"; WO 2019/157264 "Primer-Initiated Cure of Structural Adhesive Film"; WO 2019/157265 "Primer-Initiated Cure of Structural Adhesive Film"; and WO 2019/164678 "Core-Sheath Filaments and Methods of Printing an Adhesive", the disclosures of which are incorporated herein by reference.

The following references may be relevant to the general field of technology of the present disclosure: US 2005/0214497; JPS 6026079; CA 1,301,616; DE 10259457; EP 0140006; EP 0232936; EP 0889105; EP 1800865; GB 1,448,257; JP 09/111193; US 2004/0228998; US 2005/0230960; US 2008/0242764; US 2010/0061823; US 2010/0255239; US 2013/0052460; US 2016/0289513; U.S. Pat. Nos. 3,625,875; 3,639,500; 3,994,764; 3,996,308; 4,170,612; 4,316,000; 4,373,077; 4,452,955; 4,472,231; 4,569,976; 4,945,006; 4,946,529; 5,003,016; 5,106,808; 6,734,249; and WO 2014/078115.

SUMMARY OF THE DISCLOSURE

Briefly, the present disclosure provides articles comprising, in order: a) a first adherend; b) a first primer layer; c) an adhesive layer; d) optionally a second primer layer; and e) a second adherend; where the adhesive layer comprises pressure sensitive adhesive domains, which comprise a first species comprising first unsaturated free-radically polymerizable groups in an uncured state, and wherein the adhesive layer comprises structural adhesive domains, which comprise a polymer obtained by localized cure of the first species by polymerization of the first unsaturated free-radically polymerizable groups. Typically, the first primer layer covers first portions of the first adherend and does not cover second portions of the first adherend, where pressure sensitive adhesive domains of the adhesive layer are bound to second portions of the first adherend and structural adhesive domains of the adhesive layer are bound to first portions of the first adherend through the first primer layer. Typically, the structural and pressure sensitive adhesive domains are continuous from one face of the adhesive layer to the other, binding the two adherends together. The contrasting domains may be patterned. In some embodiments, discontinuous structural adhesive domains are surrounded by a continuous pressure sensitive adhesive domain. In some embodiments, discontinuous pressure sensitive adhesive domains are surrounded by a continuous structural adhesive domain. In some embodiments, the pressure sensitive adhesive domains of the adhesive layer comprise: i) a first film-forming polymer or oligomer; ii) a first species comprising first unsaturated free-radically polymerizable groups, which may be the first film-forming polymer or oligomer or a species other than the first film-forming polymer or oligomer; iii) a first transition metal cation, and optionally iv) a quaternary ammonium salt. In some embodiments, the structural adhesive domains of the adhesive layer comprise: i) a first film-forming polymer or oligomer; ii) a polymer obtained by cure of a first species comprising first unsaturated free-radically polymerizable groups by polymerization of the first unsaturated free-radically polymerizable groups; iii) a first transition metal cation; and optionally iv) a quaternary ammonium salt. Additional embodiments of the articles of the present disclosure are described below.

In another aspect, the present disclosure provides methods comprising: a) providing a first adherend; b) applying a first primer to first portions of the first adherend to form a first primer layer while leaving second portions of the first adherend bare of the first primer layer; c) applying a curable adhesive film to the first primer layer and second portions of the first adherend; and d) optionally applying a second adherend to the adhesive layer. The first primer is typically a cure-initiating primer, which may comprise an oxidizing agent such as a peroxide. The curable adhesive film is typically a pressure sensitive adhesive. The curable adhesive film may comprise: i) a first film-forming polymer or oligomer; ii) a first species comprising first unsaturated free-radically polymerizable groups, which may be the first film-forming polymer or oligomer or a species other than the first film-forming polymer or oligomer; iii) a first transition metal cation; and optionally iv) a quaternary ammonium salt. Typically, the curable adhesive film is a unitary article. The curable adhesive film may be a free-standing film. The curable adhesive film may be a hot melt processable adhesive. Additional embodiments of the methods of the present disclosure are described below.

The preceding summary of the present disclosure is not intended to describe each embodiment of the present invention. The details of one or more embodiments of the invention are also set forth in the description below. Other features, objects, and advantages of the invention will be apparent from the description and from the claims.

In this application:

"common solvents" refers to low molecular weight organic liquids commonly used as solvents by practitioners in the art, which may include aliphatic and alicyclic hydrocarbons (e.g., hexane, heptane, and cyclohexane), aromatic solvents (e.g., benzene, toluene, and xylene), ethers (e.g., diethyl ether, glyme, diglyme, diisopropyl ether, and tetrahydrofuran), esters (e.g., ethyl acetate and butyl acetate), alcohols (e.g., ethanol and isopropyl alcohol), ketones (e.g., acetone, methyl ethyl ketone, and methyl isobutyl ketone), sulfoxides (e.g., dimethyl sulfoxide), amides (e.g., N,N-dimethylformamide, N,N-dimethylacetamide, and N-methyl-2-pyrrolidone), halogenated solvents (e.g., methylchloroform, 1,1,2-trichloro-1,2,2-trifluoroethane, trichloroethylene, and trifluorotoluene), and mixtures thereof; providing that "common solvents" excludes species that act as monomers or otherwise as reactants in a given composition;

"directly bound" refers to two materials that are in direct contact with each other and bound together;

"directly applied" refers to application of one material directly to another without intervening materials;

"essentially no" amount of a material in a composition may be substituted with "less than 5 weight percent", "less than 4 weight percent", "less than 3 weight percent", "less than 2 weight percent", "less than 1 weight percent", "less than 0.5 weight percent", "less than 0.1 weight percent", or "none";

"film-forming" means capable of forming a continuous and coherent film, which in some embodiments may result from one or more of solidification, curing, drying, or solvent removal of a melt, solution, suspension, or the like;

"free-standing film" means a film that is solid at normal temperature and pressure (NTP) and has mechanical integrity independent of contact with any supporting material (which excludes, inter alfa, liquids, surface coatings dried or cured in situ such as paints or primers, and films without independent mechanical integrity);

"hot melt processable adhesive" means an adhesive comprising essentially no common solvents, which may be hot melt processed under conventional conditions, where hot melt processing includes hot melt blending and extruding;

"(meth)acrylate" includes, separately and collectively, methacrylate and acrylate;

"monomer unit" of a polymer or oligomer is a segment of a polymer or oligomer derived from a single monomer;

"normal temperature and pressure" or "NTP" means a temperature of 20° C. (293.15 K, 68° F.) and an absolute pressure of 1 atm (14.696 psi, 101.325 kPa);

"pendent" functional groups of a polymer or oligomer are functional groups that do not form a part of the backbone of the polymer or oligomer and are not terminal groups of the polymer;

"pressure sensitive adhesive" or "PSA" means materials having the following properties: a) tacky surface, b) the ability to adhere with no more than finger pressure, c) the ability to adhere without activation by any energy source, d) sufficient ability to hold onto the intended adherend, and preferably e) sufficient cohesive strength to be removed cleanly from the adherend; which materials typically meet the Dahlquist criterion of having a storage modulus at 1 Hz and room temperature of less than 0.3 MPa;

"structural adhesive" means an adhesive that binds by irreversible cure, typically with a strength when bound to its intended substrates, measured as stress at break (peak stress) using the overlap shear test described in the Examples herein, of at least 689 kPa (100 psi), in some embodiments at least 1379 kPa (200 psi), and in some embodiments at least 2067 kPa (300 psi); and "unitary" or "unitary article" refer to an article that is a single piece, though it may comprise elements that can be separately named, that is formed from a single piece or aliquot of material without division of that piece or aliquot (such as by extruding, casting, stamping, molding, forging, machining, sculpting, or the like), and that lacks seams or joints between elements.

All scientific and technical terms used herein have meanings commonly used in the art unless otherwise specified.

As used in this specification and the appended claims, past tense verbs such as "coated" and "embossed" are intended to represent structure, and not to limit the process used to obtain the recited structure, unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open-ended sense, and generally mean "including, but not limited to." It will be understood that the terms "consisting of" and "consisting essentially of" are subsumed in the term "comprising," and the like.

DETAILED DESCRIPTION

Figure 1:
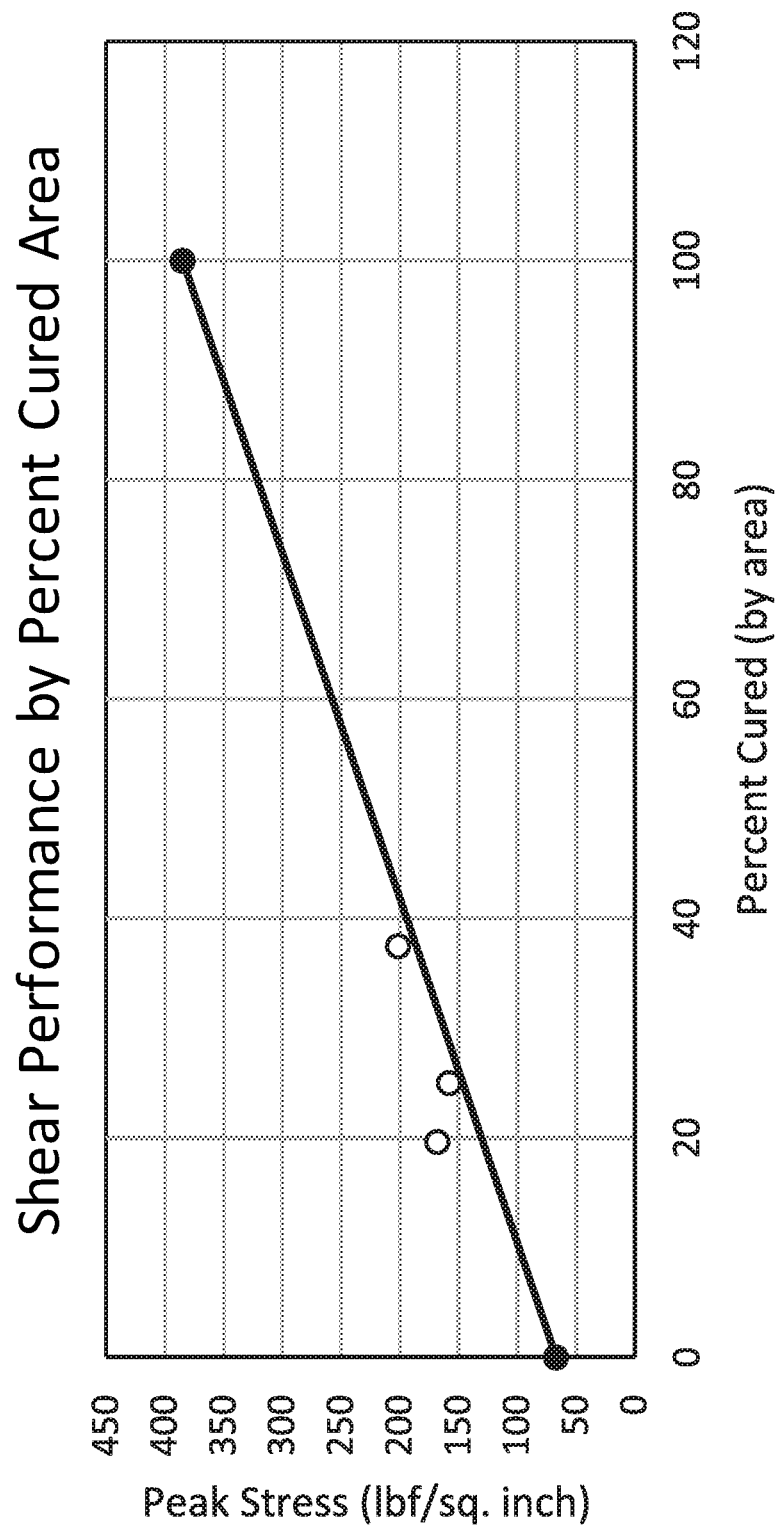
FIG. 1 is a graph of Shear Strength as a function of Percent Cured (by Area) for Examples 1 and 2 (Comparative) and Examples 3-5, described below.

The present disclosure provides articles comprising first and second adherends bound together by an adhesive layer and at least one partial primer layer; where the adhesive layer comprises pressure sensitive adhesive domains and structural adhesive domains. The pressure sensitive adhesive domains are uncured portions of the adhesive layer, whereas the structural adhesive domains are cured portions of the adhesive layer. The adhesive layer is typically a unitary article as defined herein, that is, the contrasting domains are not assembled together mechanically but result from different treatment of different portions of a single sheet of adhesive layer material. The present disclosure also provides methods which comprise applying a cure-initiating primer to first portions of a first adherend, while leaving second portions of the first adherend bare of cure-initiating primer, prior to application of curable adhesive film and a second adherend. The present cure-initiating primer is of a type which initiates cure of the curable adhesive film to form structural adhesive domains in the adhesive layer; however, the present investigators have found that this cure demonstrates limited propagation in the plane of the adhesive layer. Thus, cured structural adhesive domains are formed over the primer while uncured pressure sensitive adhesive domains remain over the unprimed portions of the first adherend. The resulting bond may demonstrate bonding characteristics intermediate between a fully cured (structural) adhesive layer or fully uncured (pressure sensitive) adhesive layer and may demonstrate bonding characteristics superior to both.

Adhesive systems comprising curable adhesive films and cure-initiating primers are disclosed in WO 2019/157264 "Primer-Initiated Cure of Structural Adhesive Film"; and WO 2019/157265 "Primer-Initiated Cure of Structural Adhesive Film", the disclosures of which are incorporated herein by reference. Any suitable adhesive layers and cure-initiating primers disclosed therein may be used in the practice of the present invention.

Any suitable primer which initiates cure of the chosen curable adhesive film may be used in the practice of the present disclosure. Typically, the primers comprise an oxidizing agent, optionally a film-forming oligomer, and optionally a transition metal cation. In some embodiments, the primers comprise a reactive oligomer comprising unsaturated free-radically polymerizable groups; an oxidizing agent; and optionally a transition metal cation. In some embodiments, the primers comprise a reactive oligomer, comprising pendent, unsaturated free-radically polymerizable groups; an oxidizing agent; and optionally a transition metal cation. In some embodiments, the primers comprise a blend of a film-forming oligomer, a reactive species comprising unsaturated free-radically polymerizable groups, an oxidizing agent; and optionally a reducible transition metal cation. In some embodiments, the primers comprise a blend of a film-forming oligomer; an oxidizing agent; and optionally a reducible transition metal cation. In some embodiments, the unsaturated free-radically polymerizable groups are selected from vinyl-containing groups such as (meth) acrylate groups. In some embodiments, the oxidizing agent comprises a peroxide group, such as a hydroperoxide group. In some embodiments, the transition metal cation is a cation of molybdenum, titanium, vanadium, chromium, manganese, iron, cobalt, nickel, copper or zinc. In some embodiments, the transition metal cation is a copper cation, such as Cu(II). In some embodiments, the transition metal cation is an iron cation, such as Fe(II) or Fe(III), such as may be found in Black 11 ($Fe_3O_4$ or $FeO \cdot Fe_2O_3$), Red 102 ($Fe_2O_3$), or Yellow 42 ($FeO(OH) \cdot H_2O$). In some embodiments, the primer additionally comprises a crosslinker comprising two or more or three or more unsaturated free-radically polymerizable groups, such as vinyl-containing groups, such as (meth)acrylate groups, which may be the same or different from any crosslinker in the curable adhesive film. In some embodiments, the crosslinker is a crosslinking monomer. In some embodiments, the crosslinker is an oligomer. In some embodiments, the primer may additionally contain excipients to facilitate transport of oxidizing agents. In some embodiments, common plasticizers may be used as excipients. In some embodiments, plasticizers such as low vapor pressure (at room temperature) plasticizers and/or high boiling point plasticizers may be used. In some embodiments the primer may additionally comprise fillers, such as solid or hollow particles comprising polymer, glass, ceramic, metal or metal oxide materials. The primer is typically applied as a solvent-borne liquid, by any suitable method, which may include brushing, spraying, dipping, and the like. Additional embodiments of the primers of the present disclosure and their use are provided in the figures and accompanying description, the Selected Embodiments, and the Examples.

Any suitable oxidizing agents may be used in the primer. Suitable oxidizing agents may include organic peroxides, inorganic peroxides or persulfates. Suitable organic peroxides may include hydroperoxides, ketone peroxides, diacyl peroxides, dialkyl peroxides, peroxyketals, peroxyesters and peroxydicarbonates. Suitable organic peroxides may include di-peroxides, which may include di-peroxides comprising the moiety R1—O—O—R2—O—O—R3, with R1 and R3 being independently selected from H, alkyl (e.g. C1 to C6), branched alkyl (e.g. C1 to C6), cycloalkyl (e.g. C5 to C10), alkylaryl (e.g. C7 to C12) or aryl (e.g. C6 to C10) and R2 being selected from alkyl (e.g. (C1 to C6) or branched alkyl (e.g. C1 to C6). Suitable ketone peroxides may include methyl ethyl ketone peroxide, methyl isobutyl ketone peroxide, methyl cyclohexanone peroxide, and cyclohexanone peroxide. Suitable peroxyesters may include alpha-cumylperoxyneodecanoate, t-butyl peroxypivarate, t-butyl peroxyneodecanoate, 2,2,4-trimethylpentylperoxy-2-ethyl hexanoate, t-amylperoxy-2-ethyl hexanoate, t-butylperoxy-2-ethyl hexanoate, di-t-butylperoxy isophthalate, di-t-butyl peroxy hexahydroterephthalate, t-butylperoxy-3,3,5-trimethylhexanoate, t-butylperoxy acetate, t-butylperoxy benzoate and t-butylperoxymaleic acid. Suitable peroxidicarbonates may include di-3-methoxy peroxidicarbonate, di-2-ethylhexyl peroxy-dicarbonate, bis(4-t-butylcyclohexyl)peroxidicarbonate, diisopropyl-1-peroxydicarbonate, di-n-propyl peroxidicarbonate, di-2-ethoxyethyl-peroxidicarbonate, and diallyl peroxidicarbonate. Suitable diacyl peroxides may include acetyl peroxide, benzoyl peroxide, decanoyl peroxide, 3,3,5-trimethylhexanoyl peroxide, 2,4-dichlorobenzoyl peroxide and lauroylperoxide. Suitable dialkyl peroxides may include di-t-butyl peroxide, dicumylperoxide, t-butyl-cumyl peroxide, 2,5-dimethyl-2,5-di(t-butylperpoxy) hexane, 1,3-bis(t-butylperoxyisopropyl)benzene and 2,5-dimethyl-2,5-di(t-butylperoxy)-3-hexane. Suitable peroxyketals may include 1,1-bis(t-butylperoxy)-3,3,5-trimethylcyclohexane, 1,1-bis(t-butylperoxy)cyclohexane, 2,2-bis(t-butylperoxy)butane, 2,2-bis(t-butylperoxy)octane and 4,4-bis(t-butylperoxy)valeric acid-n-butylester. In some embodiments, the organic peroxide is a hydroperoxide, in particular a hydroperoxide comprising the structural moiety R—O—O—H with R being (e.g. C1 to C20) alkyl, (e.g. C3 to C20) branched alkyl, (e.g. C6 to C12) cycloalkyl, (e.g. C7 to C20) alkylaryl or (e.g. C6 to C12) aryl. Suitable organic hydroperoxides may include t-butyl hydroperoxide, t-amyl hydroperoxide, p-diisopropylbenzene hydroperoxide, cumene hydroperoxide, pinane hydroperoxide, p-methane hydroperoxide and 1,1,3,3-tetramethylbutyl hydroperoxide. Suitable oxidizing agents may include peroxodisulfate components and/or peroxodiphosphate components. Suitable examples may include ammonium, sodium, and potassium peroxodisulfate components and/or peroxodiphosphate components Suitable organic peroxides may additionally include t-butyl peroxy ethylhexyl carbonate, t-butyl peroxy trimethylhexanoate, t-butyl peroxy ethylhexanoate, t-amyl peroxy ethylhexanoate, t-octyl peroxy ethylhexanoate, t-amyl peroxy ethylhexyl carbonate, t-butyl peroxy isopropyl carbonate, t-butyl peroxyneodecanoate, t-butyl peroxyisobutyrate, or t-butyl hydroperoxide.

The primer is applied to less than all of the surface of the first adherend to be covered by the adhesive layer. The primer may be applied to 1-99% of the surface of the first adherend to be covered by the curable adhesive film, 1-95%, 1-90%, 1-85%, 1-80%, 1-75%, 1-70%, 1-65%, 1-60%, 1-55%, 1-50%, 1-45%, 1-40%, 1-35%, 1-30%, 1-25%, 1-20%, 1-15%, 1-10%, 1-5%, 5-95%, 5-90%, 5-85%, 5-80%, 5-75%, 5-70%, 5-65%, 5-60%, 5-50%, 5-45%, 5-40%, 5-35%, 5-30%, 5-25%, 5-20%, 5-15%, or 5-10% of the surface of the first adherend to be covered by the curable adhesive film. Partial coverage may be accomplished by any suitable method, e.g., by the use of masks or stencils or by selective application using brushes or spray nozzles, which may be mechanically or digitally controlled. Any suitable pattern of application may be used, such as straight, curved, angled or broken lines; square, rectangular, triangular, hexagonal, or other polygonal grids; or random or ordered spots which may be circular, elliptical, polygonal, or other shapes. Pattern features may have width and/or pitch dimensions of 1-1000 micrometers, 1-500 micrometers, 1-250 micrometers, 1-125 micrometers, 1-50 micrometers, 1-25 micrometers, 1-10 micrometers, 1-5 micrometers, 5-1000 micrometers, micrometers, 5-250 micrometers, 5-125 micrometers, 5-50 micrometers, 5-25 micrometers, or 5-10 micrometers. Additional embodiments of application patterns for the primers of the present disclosure are provided in the figures and accompanying description, the Selected Embodiments, and the Examples.

Optionally, one or more secondary primers are applied to part or all of the surface of the first adherend before application of the cure-initiating primer. Optionally, one or more secondary primers are applied to part or all of the surface of the second adherend before application of the cure-initiating primer. Secondary primers are typically not cure-initiating.

Any suitable curable adhesive films may be used in the practice of the present disclosure. The curable adhesive films are typically pressure sensitive adhesives (PSA's). The curable adhesive films are typically free-standing films. The curable adhesive films are solids at NTP. In some embodiments, the films comprise a blend of a reactive oligomer comprising unsaturated free-radically polymerizable groups; optionally a reducing agent; and optionally a transition metal cation. In some embodiments, the films comprise a blend of a reactive oligomer, comprising pendent, unsaturated free-radically polymerizable groups; optionally a reducing agent; and optionally a transition metal cation. In some embodiments, the films comprise a blend of a film-forming oligomer, a reactive species comprising unsaturated free-radically polymerizable groups; optionally a reducing agent; and optionally a transition metal cation and optionally a quaternary ammonium salt. In some embodiments, the unsaturated free-radically polymerizable groups are selected from vinyl-containing groups such as (meth)acrylate groups. In some embodiments, the oligomer is a poly(meth)acrylate oligomer. In some embodiments the curable adhesive film additionally comprises a crosslinker comprising two or more or three or more unsaturated free-radically polymerizable groups, such as vinyl-containing groups, such as (meth) acrylate groups. In some embodiments, the crosslinker is a crosslinking monomer. In some embodiments, the crosslinker is an oligomer. In some embodiments the curable adhesive film additionally comprises a redox accelerator, such as a quaternary amine. In other embodiments the redox accelerator may be chosen from organic or inorganic chloride ion containing compounds such as amine hydrochlorides or sodium chloride. In some embodiments the curable adhesive film may additionally comprise fillers, such as solid or hollow particles comprising polymer, glass, ceramic, metal or metal oxide materials. Additional embodiments of the curable adhesive films of the present disclosure, tapes comprising same, and their use are provided in the figures and accompanying description, the Selected Embodiments, and the Examples.

When present, any suitable transition metal cation may be used, including those listed above in relation to the cure-initiating primer.

When present, any suitable reducing agent may be used, including organic and inorganic components and mixtures thereof. Suitable reducing agents may include ascorbic acid components, tertiary amine components, sulfinate components, sulphite components, borane components, (thio)urea components, (thio)barbituric acid components, saccharin, reducing sugars such as dextrose, glucose, and fructose, and metal salts of any of the preceding. In some embodiments, the reducing agent comprises an ascorbic acid moiety. Such reducing agents may include salts or esters of ascorbic acid or may be linked to an ascorbic acid moiety by an ether linkage. Ketals or acetals may additionally be useful. Suitable salts may include alkali metal and earth alkali metal salts like Na, K, Ca and mixtures thereof. Esters of ascorbic acid may include those formed by reacting one or more of the hydroxyl functions of ascorbic acid with a carboxylic acid, in particular C2-C30 carboxylic acids or C12-C22 carboxylic acids. Suitable examples of C2 to C30 carboxylic acids include the fatty acids, like caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid and docosahexaenoic acid. In some embodiments, the reducing agent comprises an ascorbic acid moiety and can be easily dissolved in or mixed with the other components of the film, such as a reducing agent containing a hydrophobic moiety. In other embodiments, the reducing agent may be a tertiary amines such as N,N-dimethyl-p-toluidine, N,N-dimethyl-aminoethyl methacrylate, triethanolamine, methyl 4-dimethylaminobenzoate, ethyl 4-dimethylaminobenzoate, methyldiphenylamine and isoamyl 4-dimethylaminobenzoate. In other embodiments, the reducing agent may be a sodium sulfinate derivative or an organometallic compound.

In some embodiments, the curable adhesive film has an outer surface, i.e., a substrate-facing surface, which includes embossed air bleed channels capable of aiding in escape of air during application of the outer surface to a substrate. The channels, and methods of their production, may be as taught in EP 1800865. Such channels fulfill a unique purpose in the use of the articles of the present disclosure. By allowing escape of trapped air bubbles, air bleed channels may help to improve contact with the primer. Alternately, where an adhesive film or tape has one embossed face and one that is not embossed, the non-embossed face may be placed on a first substrate and the second substrate may then be brought into contact with the embossed face. This approach may be particularly useful where two stiff substrates are to be joined, since it allows air bleed and adaptability to uneven surfaces despite the inflexibility of the substrates.

Upon contact with the cure-initiating primer, the curable adhesive film begins to cure, forming structural adhesive domains in the adhesive layer; however, the present investigators have found that this cure demonstrates limited propagation in the plane of the adhesive layer. Thus, cured structural adhesive domains are formed adjacent to the primer while uncured pressure sensitive adhesive domains remain over the unprimed portions of the first adherend. The structural adhesive domains may constitute 1-99% of the adhesive layer, 1-95%, 1-90%, 1-85%, 1-80%, 1-75%, 1-70%, 1-65%, 1-60%, 1-55%, 1-50%, 1-45%, 1-40%, 1-35%, 1-30%, 1-25%, 1-20%, 1-15%, 1-10%, 1-5%, 5-95%, 5-90%, 5-85%, 5-80%, 5-75%, 5-70%, 5-65%, 5-60%, 5-55%, 5-50%, 5-45%, 5-40%, 5-35%, 5-30%, 5-25%, 5-20%, 5-15%, or 5-10% of the adhesive layer, with the remainder of the adhesive layer being pressure sensitive adhesive domains. Any suitable pattern of structural adhesive domains may be used, such as straight, curved, angled or broken lines; square, rectangular, triangular, hexagonal, or other polygonal grids; or random or ordered spots which may be circular, elliptical, polygonal, or other shapes. Pattern features may have width and/or pitch dimensions of 1-1000 micrometers, 1-500 micrometers, 1-250 micrometers, 1-125 micrometers, 1-50 micrometers, 1-25 micrometers, 1-10 micrometers, 1-5 micrometers, 5-1000 micrometers, 5-500 micrometers, 5-250 micrometers, 5-125 micrometers, 5-50 micrometers, 5-25 micrometers, or 5-10 micrometers. In various embodiments, the structural adhesive domains may be continuous or discontinuous and the pressure sensitive adhesive domains may be continuous or discontinuous. In some embodiments, the structural adhesive domains are discontinuous and surrounded by a continuous pressure sensitive adhesive domain, e.g., an arrangement of distinct posts of structural domain separated by a continuous pressure sensitive adhesive domain. In some embodiments, discontinuous pressure sensitive adhesive domains are surrounded by a continuous structural adhesive domain.

Additional embodiments of patterns for the adhesive layer domains of the present disclosure are provided in the figures and accompanying description, the Selected Embodiments, and the Examples.

Additional embodiments of this disclosure are recited in the Selected Embodiments and Examples below.

SELECTED EMBODIMENTS

The following embodiments, designated by letter and number, are intended to further illustrate the present disclosure but should not be construed to unduly limit this disclosure.

A1. An article comprising, in order:
  a) a first adherend;
  b) a first primer layer;
  c) an adhesive layer;
  d) optionally a second primer layer;
  e) a second adherend;
  wherein the adhesive layer comprises pressure sensitive adhesive domains comprising a first species comprising first unsaturated free-radically polymerizable groups in an uncured state, and wherein the adhesive layer comprises structural adhesive domains comprising a polymer obtained by cure of the first species by polymerization of the first unsaturated free-radically polymerizable groups.

A2. The article according to embodiment A1 wherein the adhesive layer is a unitary article.

A3. The article according to any of embodiments A1-A2 wherein the adhesive layer is derived from a free-standing film.

A4. The article according to any of embodiments A1-A3 wherein the first primer layer covers first portions of the first adherend, wherein the first primer layer does not cover second portions of the first adherend, and wherein second portions of the first adherend are directly bound to the adhesive layer.

A5. The article according to embodiment A4 wherein pressure sensitive adhesive domains of the adhesive layer are directly bound to second portions of the first adherend; and wherein structural adhesive domains of the adhesive layer are bound to first portions of the first adherend through the first primer layer.

A6. The article according to any of embodiments A4-A5 wherein the first portions of the first adherend represent 1-99% of the surface of the adherend covered by the adhesive layer and the second portions of the first adherend represent 99-1% of the surface of the adherend covered by the adhesive layer.

A7. The article according to any of embodiments A1-A6 wherein the adhesive layer has a first face adjacent to the first primer layer and an opposite face, and wherein structural adhesive domains are continuous from the first face to the opposite face.

A8. The article according to any of embodiments A1-A7 wherein the adhesive layer has a first face adjacent to the first primer layer and an opposite face, and wherein pressure sensitive adhesive domains are continuous from the first face to the opposite face.

A9. The article according to any of embodiments A1-A8 wherein the first primer layer is directly bound to the first adherend and to the adhesive layer.

A10. The article according to any of embodiments A1-A9 wherein the adhesive layer is directly bound to the second adherend.

A11. The article according to any of embodiments A1-A10 comprising the second primer layer.

A12. The article according to embodiment A11 wherein the second primer layer is directly bound to the adhesive layer and to the second adherend.

A13. The article according to any of embodiments A1-A12 wherein, in the plane of the adhesive layer, one or more structural adhesive domains are surrounded by a continuous pressure sensitive adhesive domain.

A14. The article according to any of embodiments A1-A13 wherein, in the plane of the adhesive layer, two or more structural adhesive domains are discontinuous with each other and are each surrounded by a continuous pressure sensitive adhesive domain.

A15. The article according to any of embodiments A1-A14 wherein the pressure sensitive adhesive domains of the adhesive layer comprise:
  i) a first film-forming polymer or oligomer;
  ii) a first species comprising first unsaturated free-radically polymerizable groups, which may be the first film-forming polymer or oligomer or a species other than the first film-forming polymer or oligomer; and
  iii) a first transition metal cation; and optionally
  iv) a quaternary ammonium salt.

A16. The article according to any of embodiments A1-A15 wherein the structural adhesive domains of the adhesive layer comprise:
  i) a first film-forming polymer or oligomer;
  ii) a polymer obtained by cure of a first species comprising first unsaturated free-radically polymerizable groups by polymerization of the first unsaturated free-radically polymerizable groups;
  iii) a first transition metal cation; and optionally
  iv) a quaternary ammonium salt.

M1. A method comprising:
  a) providing a first adherend;
  b) applying a first primer to first portions of the first adherend to form a first primer layer while leaving second portions of the first adherend bare of the first primer layer;
  c) applying a curable adhesive film to the first primer layer and second portions of the first adherend; and
  d) optionally applying a second adherend to the adhesive layer.

M2. The method according to embodiment M1 wherein the first portions of the first adherend represent 1-99% of the surface of the adherend covered by the adhesive layer and the second portions of the first adherend represent 99-1% of the surface of the adherend covered by the adhesive layer.

M3. The method according to any of embodiments M1-M2 wherein the curable adhesive film is a unitary article.

M4. The method according to any of embodiments M1-M3 wherein the curable adhesive film is a free-standing film.

M5. The method according to any of embodiments M1-M4 wherein the curable adhesive film is directly applied to the first primer layer and second portions of the first adherend.

M6. The method according to any of embodiments M1-M5 wherein the first primer is directly applied to first portions of the first adherend.

M7. The method according to any of embodiments M1-M6 comprising applying the second adherend to the curable adhesive film.

M8. The method according to any of embodiments M1-M6 comprising directly applying the second adherend to the curable adhesive film.

M9. The method according to any of embodiments M1-M6 comprising applying a second primer to the second adherend before applying the second adherend to the adhesive layer.

M10. The method according to any of embodiments M1-M9 wherein, in the plane of the first adherend, one or more first portions of the first adherend are surrounded by a continuous second portion of the first adherend.

M11. The method according to any of embodiments M1-M10 wherein, in the plane of the first adherend, two or more first portions of the first adherend are discontinuous with each other and are each surrounded by a continuous second portion of the first adherend.

M12. The method according to any of embodiments M1-M11 wherein the curable adhesive film is a hot melt processable adhesive.

M13. The method according to any of embodiments M1-M12 wherein the curable adhesive film is a pressure sensitive adhesive.

M14. The method according to any of embodiments M1-M13 wherein the curable adhesive film comprises:
i) a first film-forming polymer or oligomer;
ii) a first species comprising first unsaturated free-radically polymerizable groups, which may be the first film-forming polymer or oligomer or a species other than the first film-forming polymer or oligomer;
iii) a first transition metal cation; and optionally
iv) a quaternary ammonium salt.

M15. The method according to any of embodiments M1-M14 wherein the first primer is a cure-initiating primer.

M16. The method according to any of embodiments M1-M15 wherein the first primer comprises an oxidizing agent.

M17. The method according to embodiment M16 wherein the oxidizing agent is a peroxide.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, WI, or may be synthesized by known methods.

All parts, percentages, ratios, etc. in the examples and the rest of the specification are by weight, unless noted otherwise. The following abbreviations may be used: m=meters; cm=centimeters; mm=millimeters; um=micrometers; ft=feet; in=inch; RPM=revolutions per minute; kg=kilograms; oz=ounces; lb=pounds; Pa=Pascals; sec=seconds; min=minutes; hr=hours; and RH=relative humidity. The terms "weight %", "% by weight", and "wt %" are used interchangeably.

Materials

| Designation | Description |
| --- | --- |
| IPA | Isopropyl alcohol |
| MEK | Methylethylketone |
| acetone | acetone |
| Copolymer 1 | Polymer composition made as described below |
| M1 | An octyl acrylate isomer blend prepared as described in Example 1 of U.S. Pat. No. 9,102,774. |
| AA | Acrylic acid available from Sigma Aldrich, St. Louis, MO. |
| Photoinitiator-1 | 2,2-dimethoxy-1,2-diphenylethan-1-one available under the trade designation IRGACURE 651 from BASF Corporation, Florham Park, NJ |
| Antioxidant-1 | Octadecyl-[3-(3,5-di-tert-butyl-4-hydroxyphenyl)propionate] available under the trade designation IRGANOX 1076 from BASF Corporation, Florham Park, NJ |
| HDDA | 1,6-Hexanediol diacrylate available from Sigma Aldrich, St. Louis, MO. |
| TBEC | tert-Butylperoxy 2-ethylhexyl carbonate available under the trade designation LUPEROX TBEC from Arkema Inc., King of Prussia, PA. |
| | 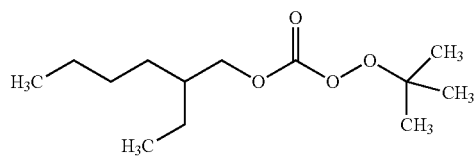 [SMILES: CCCCC(CC)COC(=O)OOC(C)(C)C] |
| BTEAC | Benzyltriethylammonium chloride available from Lindau Chemicals, Inc., Columbia, SC. |
| M410 | Ditrimethylolpropane tetraacrylate (DTMPTA) available under the trade designation MIRAMER M410 from Miwon Specialty Chemical Co., Ltd., Exton, PA. |

| Designation | Description |
|---|---|
| | 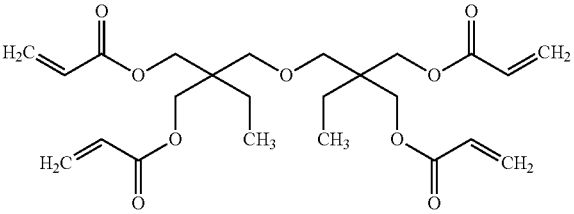 [SMILES: C=CC(=O)OCC(CC)(COCC(CC)(COC(=O)C=C)COC(=O)C=C)COC(=O)C=C] |
| UPUV | 3M ™ VHB ™ Universal Primer UV from 3M Company, St. Paul, MN, comprising 5% solids including a film-forming polymer. |
| Cu2EHA | Copper (II) 2-ethylhexanoate |

Synthesis of Copolymer 1

This material was prepared as described in Synthesis Example S1 of US 2013/0184394 A1 except that the pre-adhesive composition was as follows: 90 parts M1, 10 parts AA, 0.15 parts of Photoinitiator-1, 0.12 parts Cu2EHA, 0.4 parts Antioxidant-1 and 0.001 parts HDDA branching monomer/crosslinker.

Compounding of BTEAC Dispersion

A masterbatch premix was prepared by mixing 2640 g of BTEAC and 9360 g of M410 using a Cowles blade Cowles mixer (DISPERMAT CN-10, BYK-Gardner, Columbia, MD, USA) for 30 minutes until uniform. The mixed material was transferred to the HCPS-1/4 Immersion Mill (Hockmeyer Equipment Corporation, Elizabeth City, NC, USA) fitted with 0.50 mm wedge-wire loaded with approximately 550 grams of 1.0 mm yttrium-stabilized zirconia mill media (Torayceram, Toray Industries, Inc). The mill was operated at approximately 40Hz; and the slurry temperature was maintained around 80-85° C. during milling using thermostated bath/immersion circulator (HAAKE P1-C41P with a Phoenix II controller, ThermoFisher Scientific, NH, USA). The material was milled for 2 hours to a D90 of 15.74 micrometers PSD. Particle size was measured as described in the test methods below.

Hotmelt Compounding of the Curable Pressure Sensitive Adhesive (PSA) Film

A 30 mm diameter co-rotating twin screw extruder (available as "ZSK-30" from Werner & Pfleiderer, Ramsey, NJ) was used to prepare a curable pressure sensitive adhesive film. The twin screw extruder had 12 zones, each corresponding to one twelfth of the length of the screw, and a length to diameter ratio of 36:1. The twin screw extruder was operated at 300rpm and temperature was 250° F. (121.1° C.) in Zones 1-7, and 220° F. (104.4° C.) in Zones 8-12. Copolymer 1 in pouches was fed into a 2 inch (51 mm) Single Packer Extruder (commercially available from Bonnot, Uniontown, OH). The single Packer Extruder masticated the polymer and fed it into zone 2 of the twin screw extruder at a rate of 52.1 grams/minute. BTEAC Dispersion was fed in a split stream at a rate of 3.05 grams/minute into zone 4, a rate of 9.88 grams/minute into zone 7, and a rate of 11.29 grams/minute into zone 9 of the extruder from a peristaltic pump (505DU available from Watson Marlow Ltd., Cornwall, England) into zones 4 and 9 and a second peristaltic pump (956-0000 head on a IP56 pump available from Thermo Scientific, Barrington, IL) into zones 7 and 9. The melt mixture passed from the extruder into a polymer melt pump set at 280° F. (137.8° C.) (commercially available as "PEP-II 3 CC/REV" from Zenith Pumps of Monroe, NC) which pumped it at a rate of 84 cm$^3$/minute into a rotary rod die set to 280° F. (137.8° C.). The melt mixture was coated onto a silicone-coated polycoated kraft paper release liner as a continuous sheet of pressure sensitive adhesive having about 5 mil (0.13 mm) thickness. The curable PSA film thus formed was used in each of the Examples below.

Test Methods

Laser Cutting

Patterned masks were cut using a $CO_2$ laser plotter system (VLS 6.60 Universal Laser Systems, Scottsdale, AZ). Cuts were made with variable laser power settings on 3M™ Polyester Tape 8402 that had been placed on a silicone release coated polyester liner oriented with the green polyester tape facing the laser so that the laser passed through the green polyester tape first followed by the polyester release liner.

Patterned Primer Coating

Laser patterned green polyester tape was adhered to a cleaned stainless steel substrate and then primer was applied to the sample as described below. After allowing the primer to dry, the green polyester tape patterned mask was removed from the sample to reveal the patterned primer.

Particle Size Measurement

Particle size of the BTEAC Dispersion was measured by laser diffraction using Horiba LA-950V (Horiba, Kyoto, Japan). The following refractive index values were used for the calculation: MEK (1.3791) and BTEAC (1.4790). The second differential method was used for smoothing based on 150 iterations. The dispersion was diluted to approximately 1 weight percent solids with MEK. The diluted sample was then added to the measurement cell which was filled with MEK until the transmittance was between the recommended levels of 85-95%. The D90 is the maximum particle size below which 90% of the sample volume exists.

90° Peel Adhesion Tests

A 2 inch by 5 inch (5 cm by 12.5 cm) stainless-steel panel was washed with MEK, 50/50 water/IPA solution and acetone followed by air-drying. Depending on the Example, primer was applied to the entire contact area of the substrate, the substrate were left unprimed, or primer was applied in a pattern as described under Patterned Primer Coating, above. A 1-inch (2.5 cm) wide strip of the curable adhesive film was laminated between a patterned primed panel and a 2.8 cm wide strip of 0.003 inch (0.008 cm) thick anodized aluminum foil using a 4.5 lb (2.0 kg) roller for 3 passes at 24 inches/min. After a dwefl time of 72 hours at room temperature, a 90° peel test was performed using an insight Tensile Tester (MTS, Eden Prairie, MN) at 12 inches/inin. (30 cm/min), with data collected to indicate the change in peel adhesion as a result of cured regions from the patterned primer.

ASTM Designation: D3330. Data was recorded in pounds/inch.

Overlap Shear Tests

A 1 inch by 4 inch by 0.064 inch (2.5 cm by 10 cm by 1.6 mm) aluminum substrate was washed with MEK, 50/50 water/IPA solution and acetone followed by air-drying. Depending on the Example, primer was applied to the entire contact area of the substrate, the substrate was left unprimed, or primer was applied in a pattern as described under Patterned Primer Coating, above. A 1 inch by 1 inch (2.5 cm by 2.5 cm) portion of the tape sample (curable adhesive film on release liner) was applied to the terminal end over the top of the patterned primer. The release liner was removed and a second aluminum substrate, without primer, was applied to the sample adhesive, thus closing the bond (total bond area 1 inch by 1 inch (2.5 cm by 2.5 cm) and cured portion variable to the applied pattern) and forming a test assembly. The test assembly was wet out by rolling with an automated 15 lb (6.8 kg) roller across the bond 3 times at 24 inch/minute. The bonded test assembly dwelled at room temperature for 24 hours prior to testing.

A dynamic overlap shear test was performed at ambient temperature using a Sintech 5 Tensile Tester (MTS, Eden Prairie, MN). Test specimens were loaded into the grips and the crosshead was operated at 0.1 inch/minute, loading the specimen to failure. Stress at break was recorded in units of pounds per square inch (PSI).

ASTM Designation: D1002 Data was recorded in pounds/square inch

EXAMPLES

Example 1

Cure-initiating primer was made by mixing 0.80 g TBEC into 20.0 g UPUV in a 40 mL glass vial. The primer was applied to the entire contact area of one substrate each for shear (T2024 aluminum) and peel (stainless steel) testing. Test specimens were assembled as described above using the curable PSA film and shear and peel tests were conducted.

Example 2

No primer was applied to substrates for peel and shear testing. Test specimens were assembled for shear and peel testing with no primer applied to any substrates, i.e., the curable PSA film was applied directly to substrates for shear and peel testing conducted as described above.

Example 3

Cure-initiating primer made as in Example 1 was applied in a pattern of vertical lines (parallel to the long side of the sample substrate) during assembly of test specimens for shear and peel testing. Primer was applied so that 0.125 inch (0.318 cm) wide lines ran parallel to the long side of the sample substrate. This resulted in two lines 0.125 inch (0.318 cm) wide of cured material in the peel test (25% of peel front width), and two cured lines that were 0.125 inch by 1 inch (0.318 cm by 2.5 cm) each of the 1 inch by 1 inch (2.5 cm by 2.5 cm) total bond area of the shear sample (25.0% of total area cured).

Example 4

Cure-initiating primer made as in Example 1 was applied in a pattern of horizontal lines (parallel to the short side of the sample substrate) during assembly of test specimens for shear and peel testing. Primer was applied so that 0.125 inch (0.318 cm) wide lines ran parallel to the short side of the sample substrate. This resulted in several lines 0.125 inch (0.318 cm) wide of cured material in the peel test (0%/100% alternating of peel front width), and three cured lines that were 0.125 inch by 1 inch (0.318 cm by 2.5 cm) each of the 1 inch by 1 inch (2.5 cm by 2.5 cm) total bond area of the shear sample (37.5% of total area cured).

Example 5

Cure-initiating primer made as in Example 1 was applied in a pattern of 0.250 inch (0.635 cm) diameter dots on the area to be bonded. This resulted in two rows of cured dots in the peel test (50% of peel front width at maximum diameter), and four cured dots that were 0.05 square inch (0.32 square cm) each of the 1 inch by 1 inch (2.5 cm by 2.5 cm) total bond area of the shear sample (19.6% of total area cured).

TABLE 1

Data Summary for Examples 1-5

|  | Percent Cured (by Area) | Overlap Shear Adhesion Peak Stress (lbf/in$^2$) | Overlap Shear Adhesion Peak Stress (N/mm$^2$) | 90° Peel Adhesion (72 hr dwell) Average Peel Stress (ozf/inch) | 90° Peel Adhesion (72 hr dwell) Average Peel Stress (N/mm) |
| --- | --- | --- | --- | --- | --- |
| Example 1 | 100% | 384.72 | 2.65 | 78.4 | 0.86 |
| Example 2 | 0% | 66.98 | 0.46 | 92.32 | 1.01 |
| Example 3 | 25.0% | 157.96 | 1.09 | 77.92 | 0.85 |
| Example 4 | 37.5% | 201.22 | 1.39 | 84.8 | 0.93 |
| Example 5 | 19.6% | 167.96 | 1.16 | 92.32 | 1.01 |

It can be seen that the dot pattern of Example 5 provided peel adhesion equal to the maximum, which is demonstrated by fully uncured Example 2 (Comparative) yet had shear strength 2.5 times greater than that of Example 2 (Comparative). Example 4 represents shear and peel strength intermediate between fully cured Example 1 (Comparative) and fully uncured Example 2 (Comparative), demonstrating that the practitioner may trade off shear and peel to tune adhesive characteristics to a particular application. Comparison of Examples 3 and 4 demonstrate that the shear and peel strength characteristics of a bound substrate may be tuned directionally by the use of a directional pattern. FIG. 1 is a graph of Shear Strength as a function of Percent Cured (by Area) for Examples 1-5.

Example 6

Figure 2:
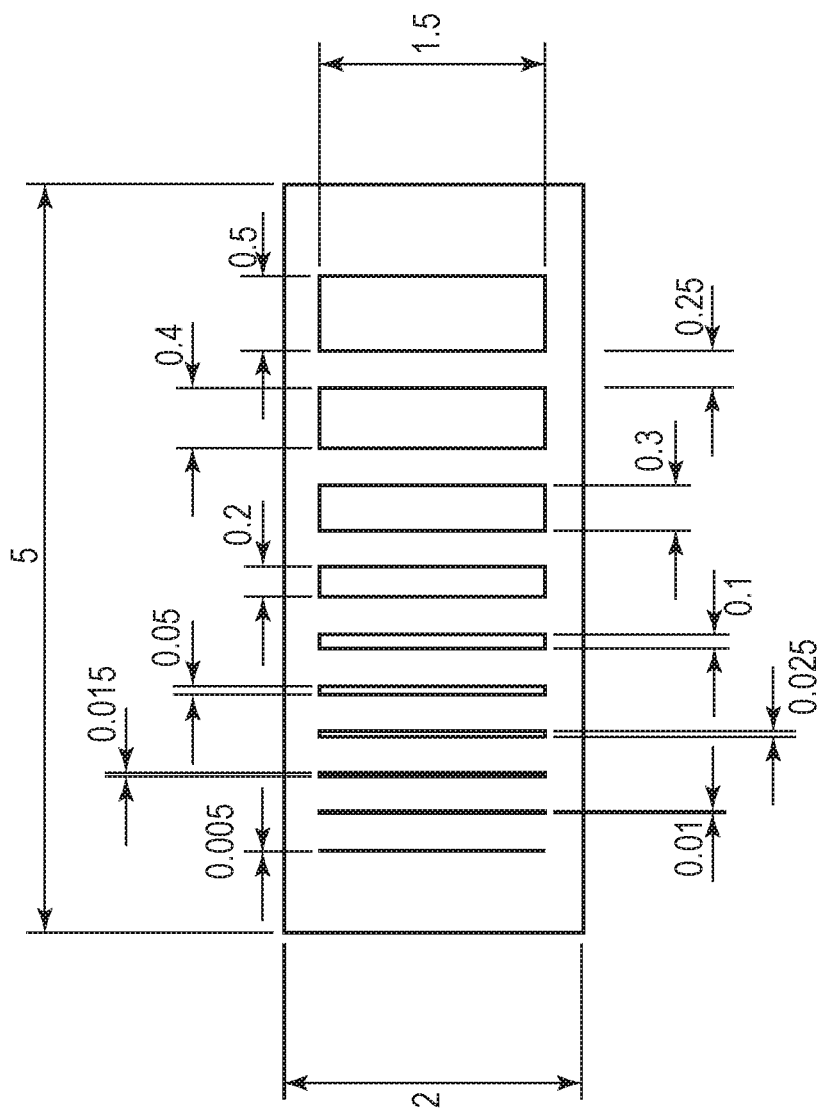
FIG. 2 represents the design of a mask used in Example 6, described below.
Figure 3:
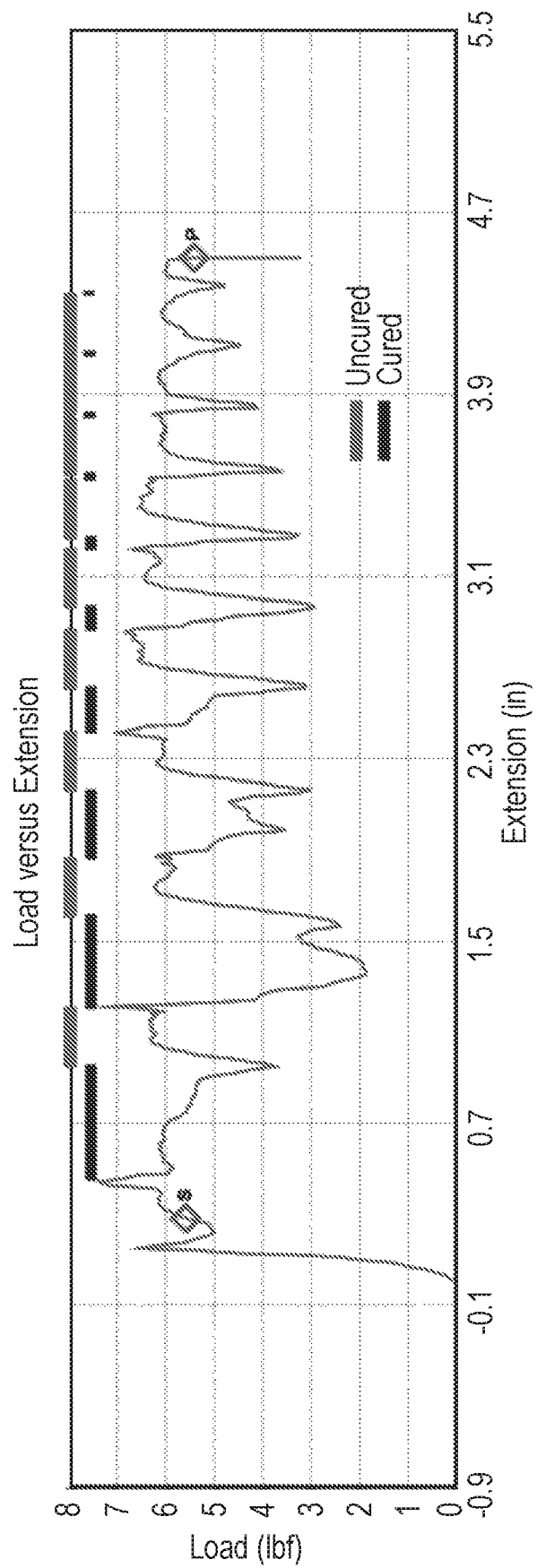
FIG. 3 is a graph of load vs. extension obtained during peel strength testing in Example 6, described below.

Cure-initiating primer made as in Example 1 was applied in a pattern of variable width lines which ran parallel to the short side of the sample substrate. This resulted in a pattern of several lines 0.5 inch (0.318 cm) wide down to 0.005 inch (0.013 cm). The design of the mask used in this process is depicted in FIG. 2. Shear samples were not generated for this example. FIG. 3 presents a graph of load vs. extension obtained during peel strength testing, demonstrating that the uncured portions of the adhesive film provided greater peel strength. In FIG. 3 "S" indicates the starting side of the peel and "P" indicates the ending side of the peel.

Various modifications and alterations of this disclosure will become apparent to those skilled in the art without departing from the scope and principles of this disclosure, and it should be understood that this disclosure is not to be unduly limited to the illustrative embodiments set forth hereinabove.

What is claimed is:

1. An article comprising, in order:
    a) a first adherend;
    b) a first primer layer;
    c) an adhesive layer;
    d) optionally a second primer layer;
    e) a second adherend;
    wherein the first primer layer covers first portions of the first adherend, wherein the first primer layer does not cover second portions of the first adherend, wherein the adhesive layer comprises pressure sensitive adhesive domains comprising a first species comprising first unsaturated free-radically polymerizable groups in an uncured state, wherein second portions of the first adherend are directly bound to the adhesive layer, wherein the adhesive layer comprises structural adhesive domains comprising a polymer obtained by cure of the first species by polymerization of the first unsaturated free-radically polymerizable groups, and wherein structural adhesive domains of the adhesive layer are bound to first portions of the first adherend through the first primer layer.

2. The article according to claim 1, wherein the adhesive layer has a first face adjacent to the first primer layer and an opposite face, wherein the structural adhesive domains are continuous from the first face to the opposite face, and wherein the pressure sensitive adhesive domains are continuous from the first face to the opposite face.

3. The article according to claim 1, wherein, in the plane of the adhesive layer, one or more structural adhesive domains are surrounded by a continuous pressure sensitive adhesive domain.

4. The article according to claim 1, wherein, in the plane of the adhesive layer, one or more pressure sensitive adhesive domains are surrounded by a continuous structural adhesive domain.

5. The article according to claim 1, wherein the pressure sensitive adhesive domains of the adhesive layer comprise:
    i) a first film-forming polymer or oligomer;
    ii) a first species comprising first unsaturated free-radically polymerizable groups, which may be the first film-forming polymer or oligomer or a species other than the first film-forming polymer or oligomer;
    iii) a first transition metal cation; and optionally
    iv) a quaternary ammonium salt.

6. The article according to claim 1, wherein the structural adhesive domains of the adhesive layer comprise:
    i) a first film-forming polymer or oligomer;
    ii) a polymer obtained by cure of a first species comprising first unsaturated free-radically polymerizable groups by polymerization of the first unsaturated free-radically polymerizable groups;
    iii) a first transition metal cation; and optionally
    iv) a quaternary ammonium salt.

7. The article according to claim 1 comprising the second primer layer.

8. The article according to claim 7, wherein the second primer layer is directly bound to the adhesive layer and to the second adherend.

9. A method of making the article of claim 1, the method comprising:
    a) providing the first adherend;
    b) applying a first primer to first portions of the first adherend to form the first primer layer while leaving second portions of the first adherend bare of the first primer layer;
    c) applying a curable adhesive film to the first primer layer and second portions of the first adherend; and
    d) applying the second adherend to the adhesive layer.

10. The method according to claim 9, wherein the curable adhesive film is a unitary article.

11. The method according to claim 9, wherein the curable adhesive film is a free-standing film.

12. The method according to claim 9, wherein, in the plane of the first adherend, one or more first portions of the first adherend are surrounded by a continuous second portion of the first adherend.

13. The method according to claim 9, wherein the curable adhesive film is a hot melt processable adhesive.

14. The method according to claim 9, wherein the curable adhesive film is a pressure sensitive adhesive.

15. The method according to claim 9, wherein the curable adhesive film comprises:
    i) a first film-forming polymer or oligomer;
    ii) a first species comprising first unsaturated free-radically polymerizable groups, which may be the first film-forming polymer or oligomer or a species other than the first film-forming polymer or oligomer;
    iii) a first transition metal cation; and optionally
    iv) a quaternary ammonium salt.

16. The method according to claim 9, wherein the first primer is a cure-initiating primer.

17. The method according to claim 9, wherein the first primer comprises an oxidizing agent.

18. The method according to claim 17, wherein the oxidizing agent is a peroxide.

* * * * *